(12) United States Patent
Kranz et al.

(10) Patent No.: US 6,233,505 B1
(45) Date of Patent: May 15, 2001

(54) PROCESS FOR DETERMINING IDEAL VEHICULAR PERFORMANCE

(75) Inventors: Thomas Kranz, Rosbach; Holger Duis; Peter Wanke, both of Frankfurt am Main; Ralf Endress, Bad Soden, all of (DE)

(73) Assignee: Continental Teves Ag & Co., OHG (DE)

( * ) Notice: Subject to any disclaimer, the term of this patent is extended or adjusted under 35 U.S.C. 154(b) by 0 days.

(21) Appl. No.: 09/180,082

(22) PCT Filed: Apr. 30, 1997

(86) PCT No.: PCT/EP97/02213

§ 371 Date: Jul. 23, 1999

§ 102(e) Date: Jul. 23, 1999

(87) PCT Pub. No.: WO97/42066

PCT Pub. Date: Nov. 13, 1997

(30) Foreign Application Priority Data

May 2, 1996 (DE) .............................................. 196 17 590

(51) Int. Cl.$^7$ ..................................................... G05D 1/00
(52) U.S. Cl. .................................. 701/1; 707/72; 707/73; 707/74; 303/144; 303/149; 303/154; 180/197
(58) Field of Search .................................... 701/1, 69, 72, 701/73, 74, 83, 84, 89, 92; 303/143, 144, 148, 149, 154; 180/197

(56) References Cited

U.S. PATENT DOCUMENTS

| | | | |
|---|---|---|---|
| 4,849,891 | * | 7/1989 | Krohn et al. ............................ 701/70 |
| 5,188,434 | * | 2/1993 | Ruf et al. .............................. 303/111 |

OTHER PUBLICATIONS

Search Report of the German Patent Office Relating to Parent German Patent Application No. 19617590.9 filed Nov. 25, 1996.

* cited by examiner

Primary Examiner—William A. Cuchlinski, Jr.
Assistant Examiner—Yonel Beaulieu
(74) Attorney, Agent, or Firm—Rader, Fishman & Grauer PLLC

(57) ABSTRACT

In order to adapt a simplified vehicle model to the driving behavior of a real automotive vehicle, it is possible to modify the slip rigidity values assumed to be constant in a linear model. After departure from the linear range of the lateral-force/slip-angle characteristic, a lower value can be assumed for the slip rigidities. However, this will involve the risk that the wheels of the rear axle are already in a slip angle range to which the lower slip rigidity is associated whereas the front wheels are still in the linear range of the lateral-force/slip-angle characteristic. This would impart to the vehicle model an oversteering behavior which should the more so be avoided if such a vehicle model is used for presetting the nominal value. This problem is solved, in the practice of the invention, by suggesting to modify only the slip rigidity values of the front axle while the ones of the rear axle are assumed to be constant.

4 Claims, 1 Drawing Sheet

PROCESS FOR DETERMINING IDEAL VEHICULAR PERFORMANCE

BACKGROUND OF THE INVENTION

The present invention relates to a method of determining the nominal driving behavior of a vehicle.

A method of the afore-described type is disclosed by DE 40 30 653 A1 describing a method for determining the slip angles and/or the lateral guiding forces of a decelerated vehicle. Based on a simplified vehicle model wherein the speed of the individual wheel, the steering angle, the yawing angle speed and the braking pressure are used as measurable variables, the slip angles and/or the lateral guiding forces are determined as estimated values. When plotting, in a diagram, the lateral guiding forces exerted on a wheel versus the momentary slip angles, a linear relationship will arise at least in respect of small slip angles. The slope of the straight line extending through the zero point is called "slip rigidity" of the respective wheel. However, a growing slip angle will render the relationship between lateral guiding force and slip angle non-linear. With a growing slip angle, the lateral guiding force approaches a peak value from which it negligibly departs again in the course of the curve. If the slip angles are in the non-linear range of the characteristic of lateral force/slip-angle, substantial differences occur between factual and simulated speeds of the yawing angle. As according to the prior known method the yawing angle speed is measured, the difference between measured and simulated yawing angle speeds are indicative of the transition from the linear to the non-linear range of the characteristic of lateral-force/slip-angle. Once it has been detected that the linear range of the lateral-force/slip-angle characteristic has been abandoned, the interconnection between lateral guiding force and slip angle is approximately defined by a straight line of a lower slope. For precisely adapting the vehicle model to the real conditions, in the prior art process, the slip rigidity of the front wheels and of the rear wheels is correspondingly modified so that the lateral-force/slip-angle characteristics of both axes conform to the real course of the curve.

Generally, a neutral driving conduct is striven for through a yawing moment control in a curve, which means that the self-steering gradient should, if possible, be zero. To that effect, it is easier for the driver to tackle a slight understeering by an additional steering lock than oversteering the vehicle. A neutral driving behavior exists if the slip rigidity values of the rear axle multiplied by the distance of the rear axle from the vehicle center correspond to the slip rigidity values of the front axle multiplied by the distance of the front axle from the vehicle center. If this product is smaller for the rear axle than the one for the front axle, thee is an oversteering behavior. The basic lay-out of modern vehicles, as a rule is slightly understeering. Assuming that the slip rigidities are identical at the front and rear, the vehicle model, in the linear range, always exhibits an understeering behavior if the distance of the rear axle from the vehicle center exceeds the distance from the front axle because the slip rigidities take constant values. However, if the slip rigidity values with a growing slip angle decrease, it might happen that the slip angles of the rear axle are already within a range in which the slip rigidity values are reduced while the front axle is still in the linear range of the characteristic of lateral-force/slip-angle. At that moment, the vehicle model would exhibit an oversteering behavior. This will involve danger, especially so if the vehicle model serves for computing a nominal value of, for example, the nominal speed of the yawing angle. In that case, the vehicle control would receive a nominal value corresponding to an oversteering behavior thus requiring a control manipulation causing the vehicle to oversteer. This involves great danger as it is substantially more difficult for the driver to tackle an oversteering than an understeering behavior. Even if the real vehicle with no manipulated control is caused to exhibit an oversteering behavior, the vehicle control, initially, does not interfere because such a behavior would then correspond to the nominal value.

The object of the present invention resides in providing a method for determining the nominal behavior of a vehicle which also takes into account the non-linear range of the lateral-force/slip-angle characteristic but preventing a nominal value corresponding to an oversteering behavior from occurring.

SUMMARY OF THE INVENTION

This problem, in the practice of the invention, is solved by reducing the slip rigidities ($C_L$) only of the wheels of the front axle. The principle underlying the invention resides in that the slip rigidities on the rear axle are kept constant so that the size of the slip angles on the rear axle is irrelevant. The slip rigidities of the vehicle model on the rear axle, in no driving situation, can become smaller than the ones on the front axle as they always correspond to the peak value of the front axle. Accordingly, the nominal value, in any event, corresponds to a neutral or slightly understeering behavior, i.e. driving situations that can be easily tackled by the driver.

In the event of further increasing slip angles then also the lateral-force/slip-angle characteristic of the front axle can be adjusted to the course of the real curve in that the lateral guiding force as of a predetermined slip angle remains constant at a peak value.

As the strongest lateral guiding force when driving through a curve is generated by the front wheel at the outer side of the curve, the adaptation of the lateral-force/slip-angle characteristic of the front axle to the real course involves a higher control quality. No instability can occur in the calculation of the vehicle state even with a zero slope, as on the rear axle, a slip angle can respectively be clearly associated to a predetermined lateral guiding force.

The reduction of the slip rigidity values of the front axle can commence when a predetermined slip angle or a threshold of a value clearly correlated to the slip angle is exceeded; thus applies both to the reduction of a slope of the lateral-force/slip-angle characteristic to a lower value, and to zero. The slip angles respectively releasing the reduction of the slope or the correlating values can be determined in response to the frictional coefficient so that the threshold for beginning and boosting the reduction of the slip rigidities is a slip angle the more so smaller slip angle, the smaller the friction coefficient between the road and the tire is.

Preferred relationships between the threshold slip angles and the friction coefficient of the road as well as other details of the invention will now be described with reference to the accompanying drawing.

BRIEF DESCRIPTION OF THE DRAWING

The only FIGURE shows a diagram in which the lateral guiding force on the front axle of the one-track model versus the slip angle of the front axle with the friction coefficient: between road and tire is plotted as a parameter.

DETAILED DESCRIPTION OF A PREFERRED EMBODIMENT

Figure 1:
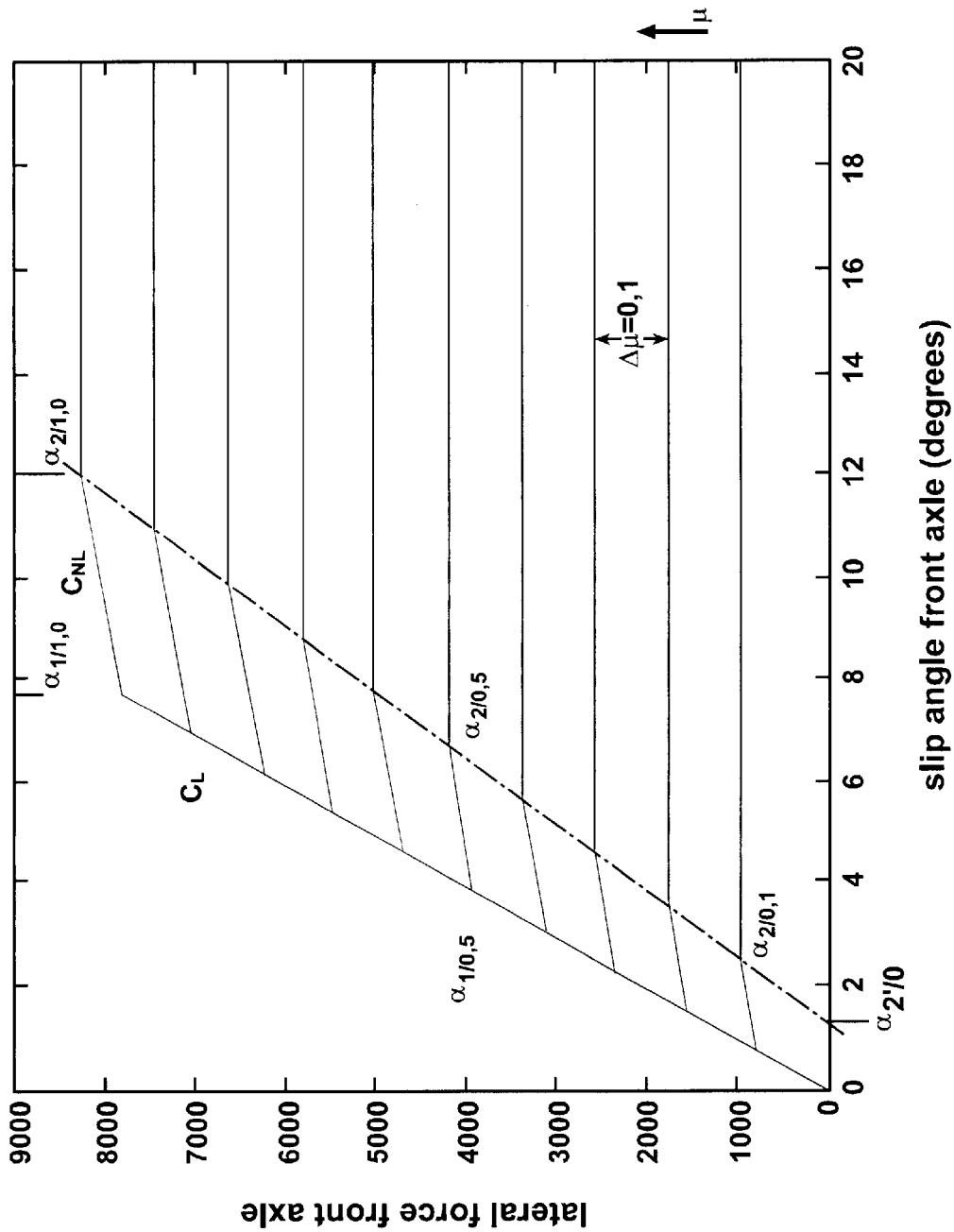

The course of the real lateral-force/slip-angle characteristic of a vehicle wheel is conveyed by the pertinent technical literature, e.g. Zomotor, Fahrwerktechnik: Fahrverhalten, published by Vogel-Verlag, Würzburg, 2nd edition 1991 (Depict 2.27).

The illustrated family of curves shows the dependence of the lateral guiding force on the slip angle of a wheel in friction coefficient increments of ):=0.1. The slip rigidity is respectively calculated from the slope of the straight line connecting the zero point to the working point on the characteristic expressed by the following formula:

$$C_i = F_{si}/\forall_i.$$

In the linear range, i.e. until reaching a predetermined slip angle threshold $\forall_{1/:}$, the slope $C_L$ of the straight line underlying the curve and passing through the zero point, corresponds to the slip rigidity. The slope of the curve section between the threshold values $\forall_{1/:}$ and $\forall_{2/:}$ is substantially reduced, namely to the value $C_{NL}$. Beyond the threshold value $\forall_{2/:}$ each curve has the slope zero. The slip rigidity, hence, has been continually reduced. What slip angle is used in each case as the threshold value for reducing the slip rigidity toward the slope $C_{NL}$ and toward the slope zero of the lateral-force/slip-angle characteristic, respectively, depends on the friction coefficient. In lieu of a slip angle, the associated lateral guiding force can be used as the threshold value.

In the form of embodiment as shown, the threshold value $\forall_{1/:}$ is stated as follows:

$$\forall_{1/:} = 7.7°*:$$

The second threshold value in which the slip rigidities are more significantly reduced so that the slope of the lateral-force/slip-angle characteristic will be zero, is expressed by the following relationship:

$$\forall_{2/:} = 1.3° + 10.7°*:$$

For slip angles $\forall < \forall_{1/0.5}$ according to the example of embodiment the lateral guiding force on the front axle is calculated as follows:

$$F_S = C_L * \forall$$

If the slip angle on the front axle is in the range of between $\forall_{1/:}$ and $\forall_{2/:}$ the lateral guiding force of the vehicle model is calculated on the basis of $$F_S = C_L * \forall_{1/:} + C_{NL} * (\forall = \forall_{1/:}).$$

Beyond $\forall_{2/:}$ the lateral guiding force remains constant and the slip rigidities are so reduced that the slope of the lateral-force/slip-angle characteristic will become zero so that the maximum lateral guiding force has the following formula:

$$F_{smax} = C_L * \forall_{1/:} + C_{NL} * (\forall_{2/:} - \forall_{1/:}).$$

How to determine $C_L$ for a vehicle is adequately taught by the pertinent technical literature. $C_{NL}$ can be stored, for example, as a fixed value or as a fixed fraction of $C_L$. The values $C_L$ and $C_{NL}$, in any case, are to be determined in a way specific of the vehicle.

With reference to the drawing, it will, again, be explained hereinafter why such a characteristic for front axle wheels and rear axle wheels is not suitable to determine a nominal value for a vehicle by means of a vehicle model. Assuming that such a diagram is also applicable to the rear axle of the vehicle, it would be possible for the rear wheels, the threshold values $\forall_1$ and $\forall_2$ of which can be different from those of the front wheels, are already in a curve section of a reduced slope, whereas the front wheels still have a slip angle which is in the linear range of the characteristic. In that case, a negative self-steering gradient would be computed for the vehicle model, i.e. the nominal value would correspond to an oversteering behavior.

Apart therefrom, in view of the type of its yaw transfer function, the model, in the non-stationary area, contains working points which, when also modifying the slip rigidities of the rear axle, will enable the nominal value to rise in case of excitation by a disturbance because the attenuation ratio in oversteering vehicles will be smaller than zero. The nominal value will then be incorrect.

In the linear simplification, in which the characteristic does not exhibit any bending points, no such problem will occur, as the slip rigidity values, irrespective of the working point on the characteristic, never can differ from one another. However, if such a characteristic is used, it should be made sure that the slip rigidity values of the rear axle will never be less than those of the front axle. The modification of the slip rigidity values of the front axle only, admittedly, on the on hand, enables an adaptation of the one-track model to reality; however, ion the other hand, provision of a nominal value corresponding to an oversteering behavior, will be rendered impossible.

According to a number of methods for manipulating the driving behavior, the friction coefficient between road and tire will be determined only if a control is just taking place. In the practical implementation of the friction coefficient-responsive modification of the slip rigidities, the difficulty is encountered that in stable driving always the high friction coefficient :∃ 1 is assumed, and the friction coefficient can be adapted to the actual road condition only after control has been initiated. This means that the friction coefficient parameter is suddenly changed and that the model will pass through unreasonable transient processes unless suitable steps be taken.

Hence, the state variables of the model at the beginning of the friction coefficient estimation are to be set to initial values conforming to the friction coefficient. Usually, the values of yaw acceleration and vehicular side slip velocity are set to zero as a stationary initial sate is assumed. However, it would also be possible to randomly use these initial values for presetting a predetermined dynamic behavior.

Setting the state variables to initial values can be made dependent on one or several conditions: On the one hand, the model may be required to have already proceeded to the non-linear part of the lateral-force/slip-angle characteristic, because in the majority of cases only in this part a control deviation is to be expected thus initiating a friction coefficient estimation. On the other hand, it may be required that the initial values be set only if the friction coefficient by a predetermined amount. The actual friction coefficient should thus be less than a predetermined threshold value. Otherwise, no adjustment of the initial values is required. Alternatively, the initial values also can be taken over unconditionally.

The yaw angular speed of the vehicle model can, for example, be set to its peak value obtainable at an optimum utilization of the friction coefficient, namely :*g $V_{REF}$ wherein g is the gravitational acceleration and $V_{REF}$ the reference speed of the vehicle. The advantage involved resides in the close relationship to physics.

Another alternative for computing the initial value of the yaw angle speed of the vehicle model resides in the take-over of the stationary end value fitting with the current steering angle according to the linear one-track model. The advantage of this alternative resides in that the calculated value of the yaw angle speed better fits in the one-track model. However, this applies only to the stable area of the one-track model and, hence, to the vehicle to be stabilized. In the unstable range, when the physical limit value is exceeded, this calculation approach provides incorrect and non-permitted, high end values corresponding to a stationary behavior. The reason for this is that the computation of the steering angle of the vehicle is taken into account thereby causing the calculated yaw angle speed to unlimitedly rise along with the steering angle. The initial value, in a progressive lock beyond the stable curve section can prevent initiation of the control from occurring for which reason this setting must be used only when the peak value of the yawing angle speed is limited.

The initial value determined according to one of the aforementioned setting can, however, be raised by a predetermined amount to take into account, on the one hand, overshooting of the true vehicle during locking and, on the other hand, to compensate the friction coefficient mostly calculated too low at the beginning of the control. The viewpoint that upon initiation of the control the optimum utilization of the lateral force has not yet been reached, also can be compensated in that upon recognition of the friction coefficient, the computed friction value is raised.

The initial value for the side slip angle of the model also can be calculated on different settings.

Most easily, the side slip angle is set to zero. In that case, at a low friction coefficient, no excessive yawing angle accelerations arise and transient states, if any, are substantially attenuated so that overshooting is prevented from occurring. However, this will apply only to the low friction coefficient and not to the high friction coefficient.

Another setting takes into account that it is desirable for conditioning the differential equation system if the slope of the yawing angle speed, i.e. the yawing angle acceleration, upon commencement of the control, starts on zero. On the assumption—which is normally permitted upon commencement of the control—that the lateral force on the front axle is near its maximum utilization, a side slip angle can be so computed that the jaw acceleration takes the value zero. However, the side slip angle will then not always be within the permitted value range. Moreover, the model can be strongly excited by the mostly excessive side slip angles so that the advantage involved with the initially horizontal yawing angle speed is set off.

A third setting is, therefore, broader: it is assumed that the lateral force is in the range of its maximum utilization so that also the yawing angle speed takes its maximum value, namely :*g
v With the preset value assuming that the yawing angle acceleration and the side slip acceleration by zero, it will be possible to determine a suitable initial value for the side slip angle.

According to a fourth setting the side slip angle is left at the last calculated value prior to commencement of the control. However, at a low friction coefficient, an undesirably high initial increase in the yawing angle speed might thereby arise, thereby also causing high transient processes on the model because the old side slip angle prior to commencement of control was calculated on the assumption of a high friction coefficient. In changing dynamic driving maneuvers, the side slip angle can be at values not fitting in the stationary working point of the one-track model.

Finally, a fifth setting is based on an empirically determined initial value for the side slip angle. To that effect it is necessary to find an interrelation between friction coefficient and side slip angle. The initial value of the side slip angle then, basically, is the stationary end value at the stability limit. Generally, a polynomial is used, with the demonstration of a straight line being used, in a first approximation, as a simplification.

It has been found that not all the settings are suitable for determining the initial value for each friction coefficient of the road. It is now possible to sue, in a way responsive to the friction coefficient, the respectively suitable setting for determining the initial value. However, if possible, a common, closed setting should be used throughout the friction coefficient range.

When taking over the initial values it is important to incorporate the same into the model only if the initial value of the yawing angular speed, with an identical sign, be less that the actual yawing rate calculated by the model on the assumption of a high friction coefficient. Otherwise the model will continue to be computed on the current value of the yawing angle speed.

However, if the initial values have been taken over, there are two alternatives for the continued model calculation. If the control deviates despite the take-over of adjusted initial values by an amount of in excess of the threshold value for initiating the yawing moment control, the control is activated and the friction calculation continued. Starting from the initial values taken over, the model is continued to be computed on the basis of the updated friction coefficient. However, in the event that through take-over of the initial values and of the actually calculated friction coefficient the threshold for commencement of the control, again, is fallen below, the control will not be activated and the friction coefficient is again set to "high friction coefficient".

If upon take-over of the initial values, the control threshold is fallen below so that no control is initiated, alternatively, the friction coefficient calculation can be continued until driving through the curve has been terminated or a new exit threshold for the estimation of the friction coefficient is fallen below. However, in the afore-described way of operation, it is assumed that a reliable estimation of the friction coefficient can only be carried out in the range of the full lateral force utilization. The described alternative could, however, result in that a friction coefficient estimated too low will lead to commencement of an unreasonable oversteering control.

If the control threshold, during the take-over of the initial values, continues to fall below thereby preventing commencement of a control, another alternative can be followed to continue the process. For example, the model can immediately be set again to the state variables fitting in the high friction coefficient and having indicated that the control thresholds are exceeded. In that case, the state variables need not be gradually re-adjusted on account of a preset high friction coefficient. If the so-called "up-rising" of the model variables is adequately rapid, resetting of the state variables is not required. The gradual adaptation of the state variables involves the additional advantage that excitation of the model for transient processes is prevented from occurring. However, such an excitation can also be avoided in that, during resetting of the state variable, the state variables last computed before take-over of the initial values, are taken over and updated in the current computing loop. It should, in any case, be avoided that in view of excessively low initial values, e.g. excessively low friction coefficients, an unjustified control manipulation be initiated forcing the vehicle to exhibit a strongly understeering behavior.

What is claimed is:

1. A method of determining the nominal driving behavior of a two-axle vehicle during control of the two-axle vehicle in a curve, comprising the steps of:

monitoring slip angle, if slip angle increases, continually reducing slip rigidity values $C_L$ only of the wheels of the front axle so that the slope of the lateral-force/side-slip-angle characteristic assumes a smaller value $C_{NL}$ wherein, once the lateral-force/side-slip-angle characteristic approaches a peak value, reducing the slip rigidity values with a growing slip angle continually such that the slope of the lateral-force/side-slip-angle characteristic is approximately zero, wherein the reduction toward a reduced slope and toward a zero slope of the lateral-force/side-slip-angle characteristic is effected once a first and a second predetermined threshold value, respectively, of a variable correlating with the slip angle is exceeded, wherein the predetermined threshold values are dependent on a calculated road friction coefficient, which is the greater the higher the road friction coefficient is, wherein the first threshold value for reduction of the slip rigidities $C_L$ toward the smaller value $C_{NL}$ of the slope is a predetermined slip angle $\alpha_{1/\mu}$ and directly proportional to the road friction coefficient $\mu$.

2. A method according to claim 1, wherein the predetermined slip angle $\alpha_{1/\mu}$ for reduction of the slip rigidities toward the smaller value $C_{NL}$ of the slope is computed in accordance with equation $\alpha_{1/\mu} = k_1 * \mu$, with $k_1$ being a constant value determined in a vehicle-specific way.

3. A method according to claim 1, wherein the second threshold value for reduction of the slip rigidities $C_L$ toward a zero slope is a predetermined slip angle $\alpha_{2/\mu}$ and has the following correlation to the friction coefficient $\mu$:

$$\alpha_{2/\mu} = \alpha_{2/0} + k_2 * \mu,$$

with $k_2$ and $\alpha_{2/0}$ being constant factors determined in a vehicle-specific way.

4. A method of determining the nominal driving behavior of a two-axle vehicle during control of the two-axle vehicle in a curve, comprising the steps of:

monitoring slip angle, if slip angle increases, continually reducing slip rigidity values $C_L$ only of the wheels of the front axle so that the slope of the lateral-force/side-slip-angle characteristic assumes a smaller value $C_{NL}$, wherein, once the lateral-force/side-slip-angle characteristic approaches a peak value, reducing the slip rigidity values with a growing slip angle continually such that the slope of the lateral-force/side-slip-angle characteristic is approximately zero, wherein the reduction toward a reduced slope and toward a zero slope of the lateral-force/side-slip-angle characteristic is effected once a first and a second predetermined threshold value, respectively, of a variable correlating with the slip angle is exceeded, wherein the predetermined threshold values are dependent on a calculated road friction coefficient, which is the greater the higher the road friction coefficient is, wherein the second threshold value for reduction of the slip rigidities $C_L$ toward a zero slope is a predetermined slip angle $\alpha_{2/\mu}$ and has the following correlation to the friction coefficient $\mu$:

$$\alpha_{2/\mu} = \alpha_{2/0} + k_2 * \mu,$$

with $k_2$ and $\alpha_{2/0}$ being constant factors determined in a vehicle-specific way.

* * * * *